March 18, 1941.  J. A. MALARKEY  2,235,230

PLYWOOD TILING

Filed Aug. 22, 1938

JAMES A. MALARKEY
INVENTOR
BY
ATTORNEY.

Patented Mar. 18, 1941

2,235,230

UNITED STATES PATENT OFFICE 2,235,230

PLYWOOD TILING

James A. Malarkey, Portland, Oreg., assignor to M and M Wood Working Company, Portland, Oregon, a corporation of Oregon Application August 22, 1938, Serial No. 226,097

2 Claims. (Cl. 20—91)

This invention relates to a new article of manufacture in the nature of a panel constructed of wood, and more particularly to a plywood panel upon which is superimposed a multiplicity of small, independent units of wood veneer in imitation of tiling, and to the process for producing the same.

The product of the present invention consists of a plywood base comprising a plurality of plies of wood veneer, and so constructed that the grain of alternate plies is normal to the grain of the adjacent plies. The plies are bonded together with a bond which is impervious to moisture, a preferred bonding agent being a synthetic resin such as urea or phenol formaldehyde. The principal face of the panel is composed of a multiplicity of independent units of hardwood veneer, these being arranged in predetermined pattern in imitation of tiling. Each unit of the hardwood veneer is bonded to the plywood base by a water proof bond, and the grain of each unit is normal to the grain of the ply to which it is bonded.

The process of producing the product consists in manufacturing the plywood base in the manner hereinabove described and bonding to the obverse surface thereof a ply of hardwood veneer. Thereupon the hardwood veneer is provided with a multiplicity of intersecting scores or kerfs which separate the hardwood veneer into the requisite number of independent units to produce the desired pattern.

Applicant has discovered that the tendency of surface veneers to stay in place so as to maintain their machined design is greatly increased when the surface area is composed of small, independent units; as compared with an imprinted or cut-in design on a single veneer covering a large surface. This is due to the fact that although the shrinkage factor is constant for a small and large piece of the same material, the combined shrinkage in a small unit is much less than in a large unit. For this reason, where shrinkage may cause detrimental effects in large surfaces, it will not have a noticeable effect on the same area composed of small independent surface units.

To the accomplishment of the recited advantages and others coordinate therewith, the preferred embodiment of the invention resides in the construction and arrangement of parts hereinafter described, illustrated in the accompanying drawing, and embraced within the scope of the appended claims.

Figure 1:
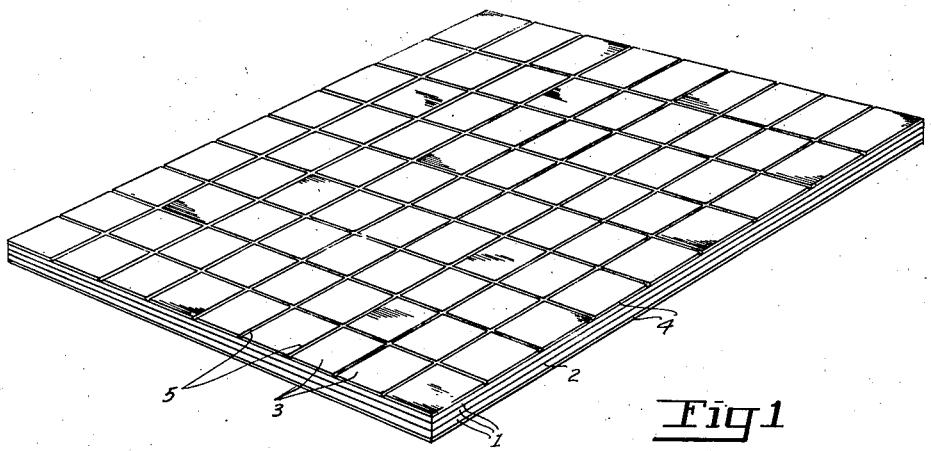
Figure 1 is a perspective view of a panel embodying the principles of the present invention.
Figure 4:
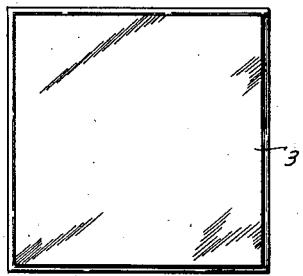
Figure 4 is a plan view of one of the surface units.
Figure 2:
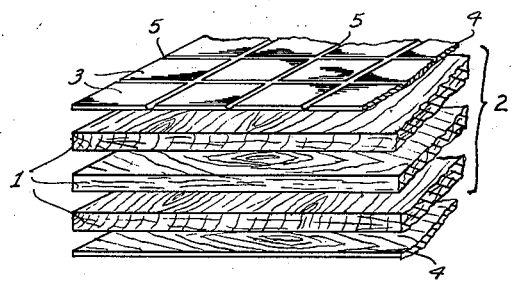
Figure 2 is a perspective view of a fragmentary portion of the panel illustrating its construction.
Figure 3:
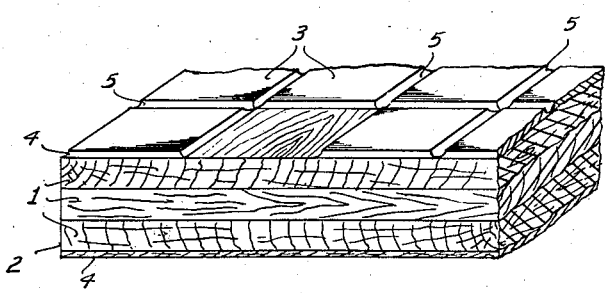
Figure 3 is a perspective view of a fragmentary portion of the panel, one of the surface units being removed therefrom to illustrate the complete independence of the respective units.

As illustrated in the drawing, the product comprises a panel consisting of a plurality of sheets 1 of wood veneer which are bonded together to form a base 2, upon which is superimposed a multiplicity of independent units 3 of wood veneer so constructed and arranged as to simulate tiling. The core or base 2 may comprise any number of sheets of veneer, it being highly preferable, however, that the completed panel consist of an uneven number of plies so that the lateral forces which tend to warp or twist the veneers will be distributed equally to both sides of the longitudinal center of the panel. As has been stated, the veneers are so laid up that the grain of alternate plies is normal to the grain of adjacent plies. The drawing discloses a panel which is made of five plies of veneer, the center ply and the two adjacent plies being formed of core veneers, and the outside plies being formed of face veneers 4. Preferably, the face veneers 4 are of hardwood, whereas the core veneers may be of fir or pine. In the five ply construction illustrated, the grain of the center ply is parallel with the grain of the face veneers, whereas the grain of the two plies intermediate between the center and face plies is disposed at a right angle thereto. Thus it will appear that the grain of the face veneer is normal to the grain of the core veneer to which it is bonded. All of the bonds used in the construction of the panel are effected by the use of a water proof gluing composition, and the resulting product is impervious to moisture. When the panel thus made is completed, the face veneer forming the principal surface thereof is sawed both longitudinally and transversely of its surface in such manner as to create a multiplicity of intersecting scores or kerfs 5 which extend through the face veneer and separate it into a multiplicity of independent surface units in imitation of tiling.

Important advantages of the construction are that tiling can be produced in large panels and applied directly on studding at very low cost, and that even when so applied the product cannot crack or split. Furthermore, the insulation value of the product is greatly in excess of the insulation value of similar materials, and condensation of moisture thereon is correspondingly reduced.

Having now described my invention and in what manner the same may be used, what I claim as new and desire to protect by Letters Patent is:

1. A tiled panel consisting of a plurality of plies of wood veneer, the grain of each ply of veneer being disposed transversely of the grains of adjacent plies bonded thereto, each of said plies of veneer being coextensive with every other ply in said panel, the ply of veneer forming the principal surface of said panel containing intersecting saw cuts of a depth substantially equal to the thickness of said surface veneer, said saw cuts being disposed to create a crack resisting surface of substantially independent units of wood veneer, the whole extent of said surface being composed of said ply of veneer wherein the grain runs in the same direction throughout said surface.

2. A tiled panel consisting of a plurality of plies of wood veneer, the grain of alternate plies of veneer being disposed in a direction normal to the grain of adjacent plies of veneer, each of said plies of veneer being coextensive with every other ply in said panel, the ply of veneer forming the principal surface of said panel containing intersecting saw cuts substantially through said ply of veneer to produce a pattern consisting of substantially separated units of surface veneer, all of said veneers being bonded together with a waterproof bonding composition.

JAMES A. MALARKEY.